(12) United States Patent
Sugihara et al.

(10) Patent No.: US 7,128,378 B2
(45) Date of Patent: Oct. 31, 2006

(54) CORELESS RUBBER CRAWLER

(75) Inventors: Shingo Sugihara, Yokohama (JP); Shuichi Matsuo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/485,300

(22) PCT Filed: Jul. 30, 2002

(86) PCT No.: PCT/JP02/07727

§ 371 (c)(1),
(2), (4) Date: Jun. 3, 2004

(87) PCT Pub. No.: WO03/011677

PCT Pub. Date: Feb. 13, 2003

(65) Prior Publication Data
US 2004/0195915 A1 Oct. 7, 2004

(30) Foreign Application Priority Data
Jul. 30, 2001 (JP) .............................. 2001-228898

(51) Int. Cl.
*B62D 55/24* (2006.01)

(52) U.S. Cl. ...................... 305/166; 305/167; 305/170

(58) Field of Classification Search ................ 305/157, 305/158, 159, 165, 166, 167, 170, 178
See application file for complete search history.

(56) References Cited

U.S. PATENT DOCUMENTS

| | | | | |
|---|---|---|---|---|
| 2,476,460 A | * | 7/1949 | Smith ......................... 305/112 |
| 2,476,828 A | * | 7/1949 | Skromme .................. 305/170 |
| 3,072,443 A | * | 1/1963 | Yoe .............................. 305/34 |
| 3,212,627 A | * | 10/1965 | Beebee ....................... 198/847 |
| 3,758,171 A | * | 9/1973 | Plastino ....................... 305/40 |
| 4,648,856 A | * | 3/1987 | Matsunaga ................. 474/237 |
| 5,615,000 A | * | 3/1997 | Ueda et al. ................. 399/361 |
| 6,068,354 A | * | 5/2000 | Akiyama et al. ........... 305/160 |
| 6,412,263 B1 | * | 7/2002 | Lee et al. ..................... 57/210 |
| 2001/0003403 A1 | * | 6/2001 | Lussier ....................... 305/178 |

FOREIGN PATENT DOCUMENTS

| | | | |
|---|---|---|---|
| JP | 55-119572 | * | 9/1980 |
| JP | 59-177205 | * | 3/1983 |
| JP | 4-212680 | * | 8/1992 |
| JP | 5-147561 | * | 6/1993 |

* cited by examiner

*Primary Examiner*—Russell D. Stormer
(74) *Attorney, Agent, or Firm*—Sughrue Mion, PLLC

(57) ABSTRACT

The object of the present invention is to provide a coreless rubber which ensures running stability by compensating shift (deviation) in the width direction even if prepared by combination of usual rollers, and which is easily and in low cost prepared by adoption of simple structure.

5 Claims, 7 Drawing Sheets

(A)

(B)

(C)

CORELESS RUBBER CRAWLER

BACKGROUND OF INVENTION

1. Field of the Invention

The present invention relates to a rubber crawler used in the condition that is rotatably connected around a driving roller and a driven roller, particularly a coreless rubber crawler in the form of endless belt having main cords and bias cords embedded therein.

2. Description of the Related Art

Usually, a coreless rubber crawler is frequently used for a high-speed running vehicle because the crawler shows a reduced vibration and running resistance as compared with a core-embedded rubber crawler. However, the coreless rubber crawler has a poor transverse stiffness as compared with the core-embedded rubber crawler, and therefore main cords and further bias cords are embedded in the coreless rubber crawler.

In case the main cords (i.e., main cord layer) and bias cords (i.e., bias cord layer) are embedded in a rubber crawler in the form of endless belt, there is generated torsion (meandering) in the width direction which is caused by extension angles of cords of the cord layers and return force of twist of the cords when the rubber crawler is driven in the running direction by the driving rollers. In the worst case, there is possibility that the rubber crawler disconnects from the driving and driven rollers.

To solve the above problems, JA 1 O-59228 discloses a first conventional core-embedded rubber crawler wherein steel twist wires are extended in the peripheral direction (lengthwise direction) between the core member and the ground surface of the rubber crawler, the steel twist wires comprising an S-twist wire and a Z-twist wire arranged alternately such that the adjacent twist wires compensate torsion caused by return force of twist of each of the twist wires.

Further, FIG. 7 illustrates a second conventional rubber crawler as disclosed in JA11-301536, which was filed by the present applicant. In the crawler, cord layers 102Z, 102S, which are wound in the directions opposite to each other, are arranged so as to be adjacent to each other in the crosswise direction whereby torsion moments caused by the wound tensions are compensated each other.

Furthermore, FIGS. 8 and 9 illustrate a third conventional rubber crawler, which was similarly filed by the present applicant. In the crawler, a main cord layer 204 extended in the lengthwise direction and a bias cord layer consisting of plural cords 205, 206 superposed on the main cord layer 204 are embedded in the rubber crawler, the plural cords 205, 206 having extension angles of the cords in the directions opposite to each other on the same plane of the plural cords 205, 206.

In a rubber crawler driving device wherein the above rubber crawler 201 in the form of endless belt is rotatably connected around a driving roller 210 and a driven roller 211, the diameters of the driving roller 210 and driven roller 211 are reduced against the direction of sharing torsion force which is generated in the rubber crawler 201 by tension caused by driving of the crawler owing to the angles of the cords of the bias cords 205, 206. This reduction of the diameters compensates the sharing torsion force to ensure running stability without shift (deviation) in the crosswise direction.

However, though, in the core-embedded rubber crawler of the first conventional example, the S-twist wire and Z-twist wire arranged alternately compensate the return force of twist of the twist wires by the twist wires adjacent to each other, the crawler is not capable of compensating the shift (deviation) of the crawler generated in the width direction of the driving or driven roller owing to some cause, for example, force generated when the crawler collides with an obstacle on a road surface. Hence, it is required that a guide projection is formed on the core to prevent the crawler from disconnecting from the rollers, whereby the rubber crawler is obliged to be complicated in its structure and increased in its weight.

In the second conventional example of FIG. 7, the cord layers 102Z, 102S wound in the directions opposite to each other are embedded so as to be adjacent to each other in the width direction whereby torsion moments caused by the wound tensions can be compensated each other. Further, in case the crawler is shifted in the width direction of the driving or driven roller owing to some cause, the tractive drive in the running direction of the rubber crawler resulted from driving of the driving roller generates torsion (meandering) in the width direction depending on extension angles of cords of the cord layer, whereby the shift (deviation) in the width direction is compensated to restore to the original state. However, a complicated winding machine and complicated processes are needed for winding spirally a long cord as above.

Furthermore, in the third conventional example of FIG. 8, the good combination of the plural cords 205, 206 having extension angles of the cords in the directions opposite to each other on the same plane and the diameters of the driving roller 210 and driven roller 211 reduced in the outer direction of the axis of the rollers compensates the sharing torsion force to ensure running stability without shift (deviation) in the crosswise direction. However, it is required to combine the driving roller 210 with the driven roller 211, both the rollers having special shape, and therefore it is difficult to apply the above technique to a driving device provided with usual rollers.

SUMMARY OF THE INVENTION

Hence, the object of the present invention is to provide a coreless rubber crawler which can be obtained by improving the above conventional examples or the rubber crawlers suggested by the present applicant, which ensures running stability by compensating shift (deviation) in the width direction even if prepared by combination of usual rollers, and which is easily and in low cost prepared by adoption of simple structure.

The present invention is provided by a coreless rubber crawler in the form of endless belt comprising a number of cords embedded in a main body of the rubber crawler at predetermined intervals in a width direction of the rubber crawler and extending in a lengthwise direction of the rubber crawler, and being rotatably connected around a driving roller and a driven roller, wherein the main body is divided into two areas by a centerline in the width direction of the main body, one of the two areas comprising S-twist cords and the other area comprising Z-twist cords, and wherein the S-twist cords and the Z-twist cords are each inclined in an outside direction with respect to the centerline when viewed from the running direction.

Further, the present invention is provided by a coreless rubber crawler in the form of endless belt comprising a number of cords embedded in a main body of the rubber crawler at predetermined intervals in a width direction of the rubber crawler and extending in a lengthwise direction of the rubber crawler, and being rotatably connected around a driving roller and a driven roller, wherein the main body is divided into two areas by a centerline in the width direction of the main body, one of the areas located on a left side with respect to a running direction comprising S-twist cords and the other area located on a right side with respect to the running direction comprising Z-twist cords, and wherein the S-twist cords and the Z-twist cords are each inclined in an outside direction with respect to the centerline when viewed from the running direction.

In the coreless rubber crawler, it is preferred that the driving roller and the driven roller comprises a pair of rollers having the same width as each other, the rollers being a left roller and a right roller located at intervals with respect to an axis of the rollers.

Further, in the crawler, it is preferred that the S-twist and Z-twist cords and a cord layer superposed thereon are provided in the main body of the rubber crawler, the cord layer having cord arrangement capable of compensating a meandering property in a width direction of the main body.

Moreover, in the crawler, it is preferred that the S-twist and Z-twist cords and a perpendicularly crossing cord layer superposed thereon are provided in the main body, the perpendicularly crossing cord layer having a cord angle crossing at right angles with respect to a peripheral direction of the main body.

DETAILED DESCRIPTION OF THE INVENTION

Figure 1:
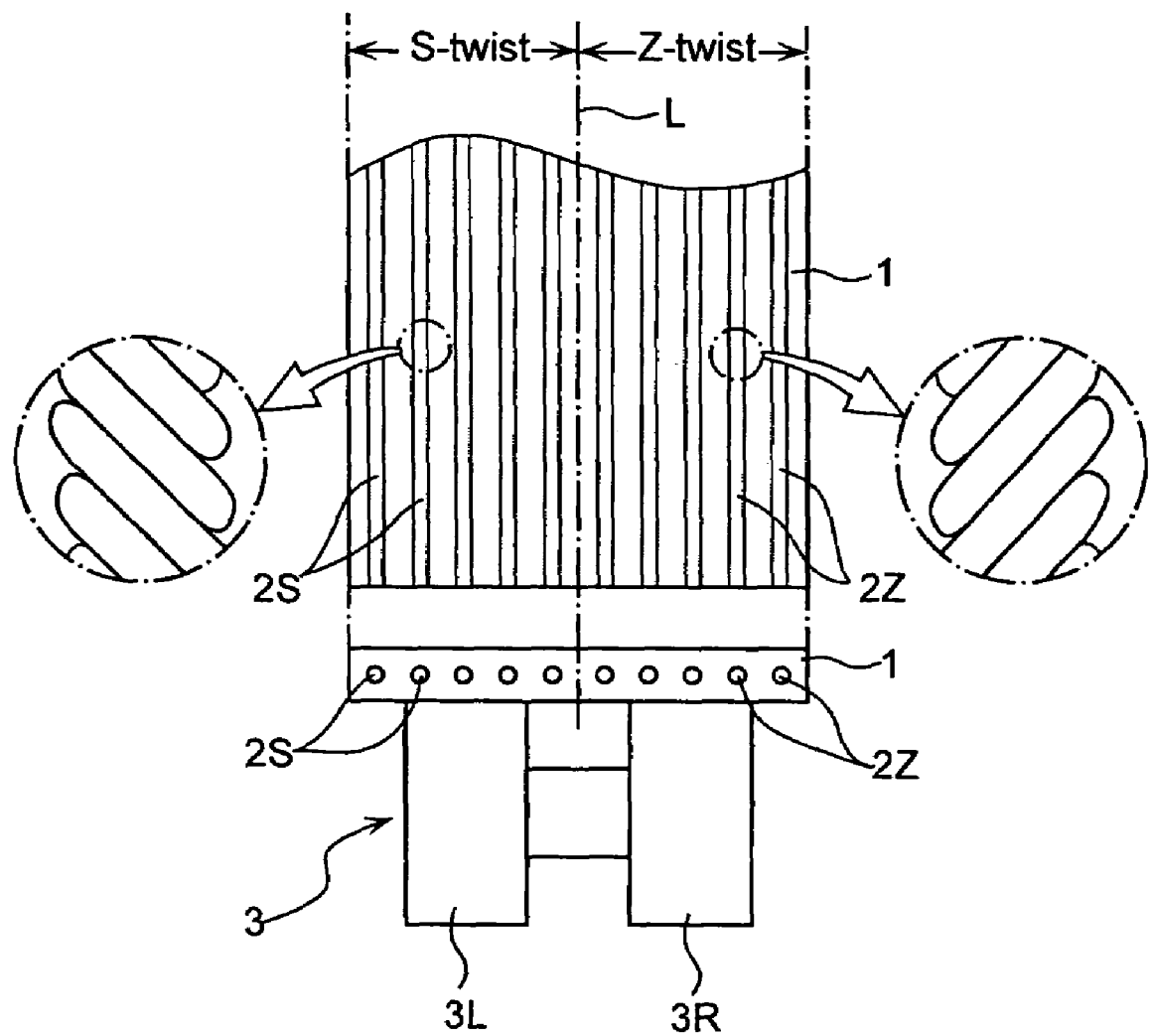
FIG. 1 is a view showing a first embodiment of the coreless rubber crawler according to the invention, which shows the condition that the rubber crawler is rotatably connected around the rollers under ordinary driving condition.
Figure 2:
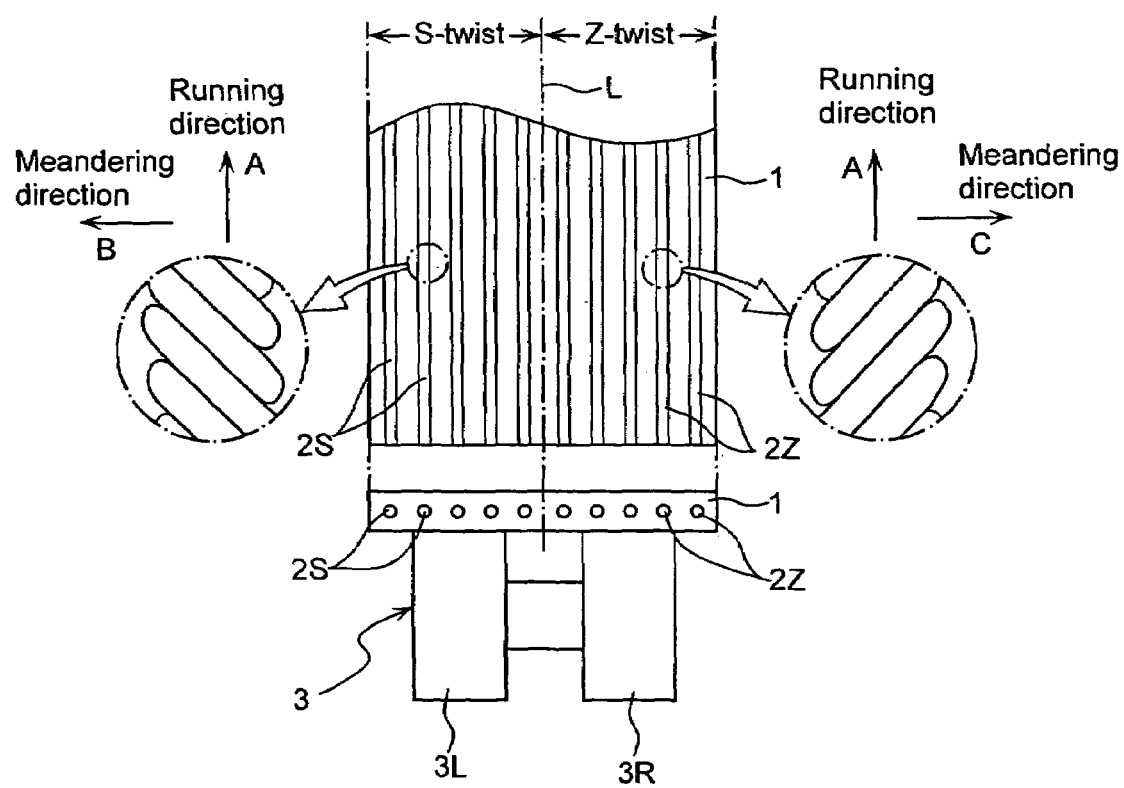
FIG. 2 is a view showing a first embodiment of the coreless rubber crawler of the invention, which shows the meandering force caused by application of driving force.
Figure 3:
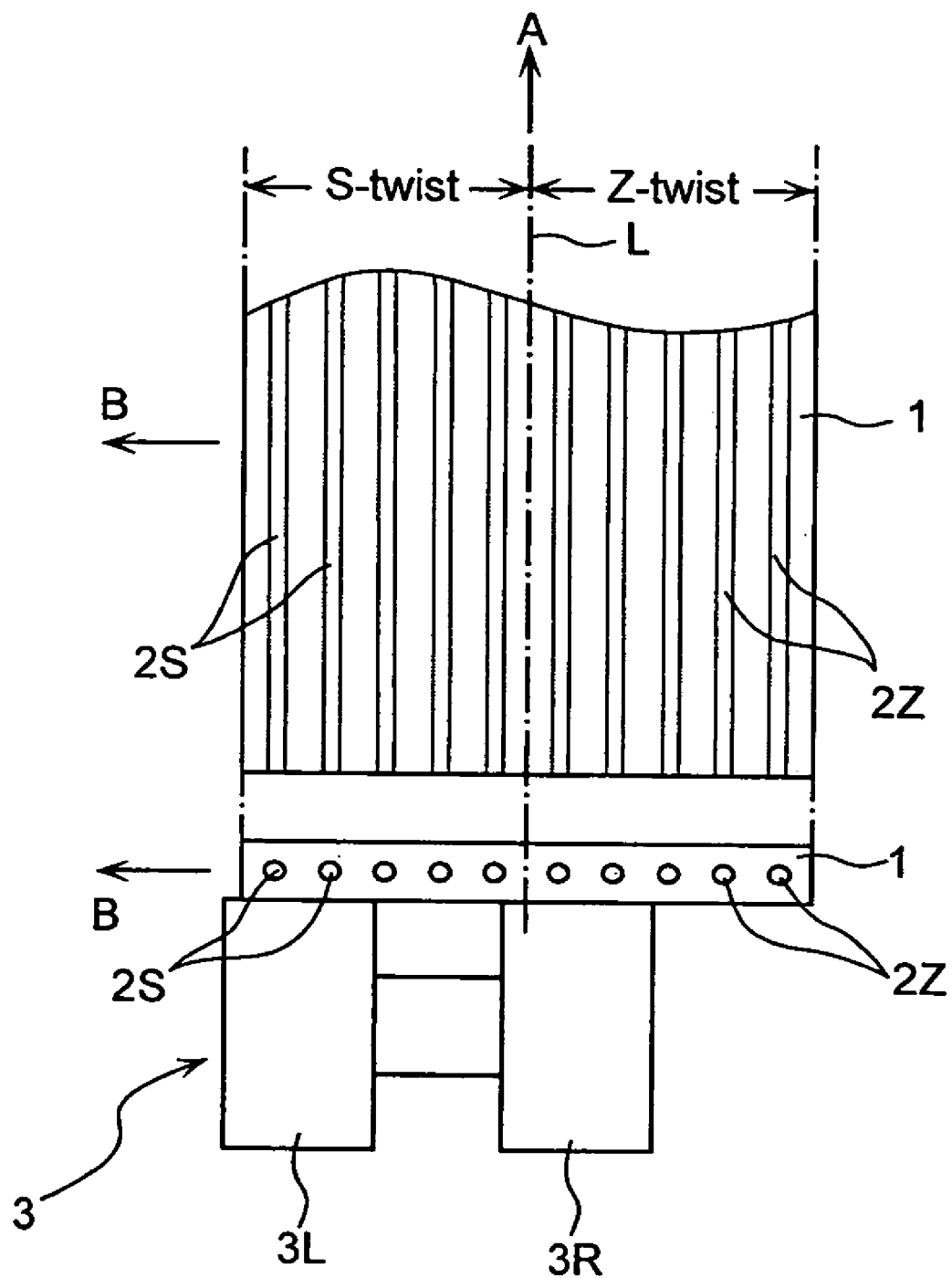
FIG. 3 is a view showing a first embodiment of the coreless rubber crawler of the invention, in which shows the condition that the crawler is shifted in the width direction of the roller.
Figure 4:
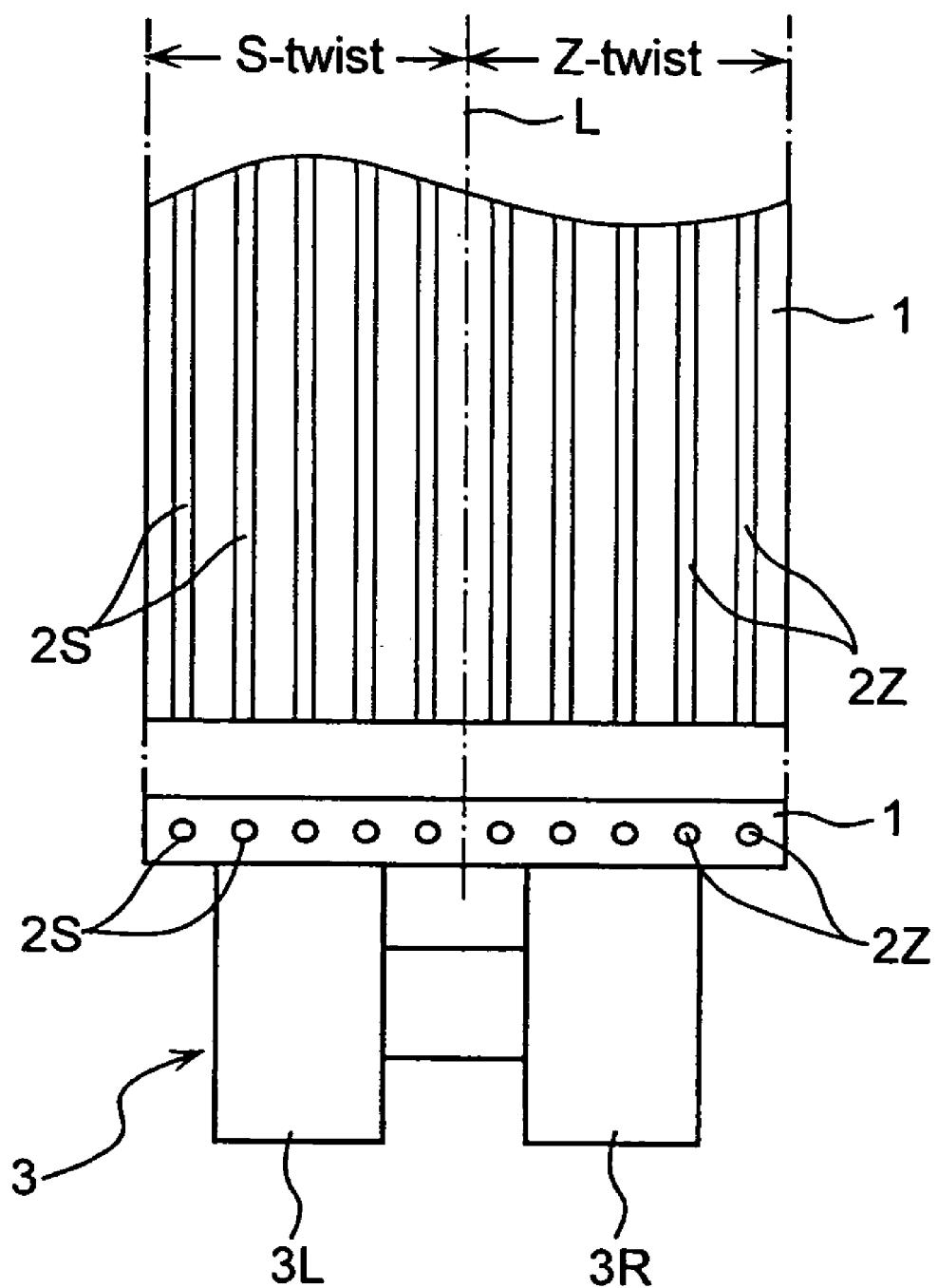
FIG. 4 is a view showing a first embodiment of the coreless rubber crawler of the invention, in which shows the condition that the shift of the crawler is compensated.

The embodiments of the invention are explained based on the attached drawings as follows:

FIGS. 1 to 4 are views showing a first embodiment of the coreless rubber crawler according to the invention. FIG. 1 shows the condition that the rubber crawler is rotatably connected around the rollers under ordinary driving condition. FIG. 2 shows the meandering force of the crawler caused by application of driving force. FIG. 3 shows the condition that the crawler is shifted in the width direction of the roller. FIG. 4 shows the condition that the shift of the crawler is compensated.

In the coreless rubber crawler of the invention, a number of cords 2 are embedded in a main body 1 of the rubber crawler at predetermined intervals in a width direction of the rubber crawler, and the rubber crawler, which is shaped in the form of endless belt, is rotatably connected around a driving roller 3 and a driven roller 3, as is shown in FIG. 1.

With respect to a centerline of the main body, that is the centerline obtained by connecting the central points in the width direction of the main body, the crawler is divided into two areas, and one of the two areas comprises S-twist cords while the other area comprises Z-twist cords. In the preferred embodiment, a number of cords 2 are embedded in a main body 1 of the rubber crawler according to the above arrangement, and the rubber crawler in the form of endless belt is rotatably connected around a driving roller 3 and a driven roller 3 in order to exhibit the function of the invention under the forward running conditions, which constitute most of the running conditions, of the endless belt.

In this rubber crawler, as shown in the enlarged views indicated by the white arrows, cords located on a left side of a running direction with respect to the centerline L in the width direction of the main body 1 comprises S-twist cords 2S, while cords located on a right side of the running direction comprises Z-twist cords 2Z.

In this embodiment, S-twist cords 2S and Z-twist cords 2Z are formed as a single layer, and these two twist cords are each arranged on the two areas of the layer divided with respect to the centerline extending in the peripheral direction (longitudinal direction) along center in the width direction of the main body. In more detail, the cords on a left side of a running direction are composed of S-twist cords 2S and the cords on a right side of a running direction are composed of Z-twist cords 2Z, and these cords are embedded in the main body as it is or after rubberizing them. Inside of the main body 1 of the rubber crawler, driving rollers 3 and driven rollers 3 each of which comprise a pair of rollers, i.e., a left roller 3L and a right roller 3R, located at intervals with respect to an axis of the rollers are arranged.

When the main body 1 of the rubber crawler having the above structure is pulled in the A direction indicated the arrow by driving of the driving rollers 3 as shown in FIG. 2, meandering force in the left direction B generated by torsion force resulted from twist return of S-twist acts on the main body on the side of the S-twist cords 2S corresponding to the left side in the running direction, while meandering force in the right direction A generated by torsion force resulted from twist return of Z-twist acts on the main body on the side of the Z-twist cords 2Z corresponding to the right side in the running direction. These meandering forces A, B in the opposite directions to each other are compensated each other, and therefore the S-twist cord portion and Z-twist cord portion are not each sifted on the left roller 3L and the right roller 3R whereby the running stability (straight forward performance) of the crawler can be ensured.

In contrast, when the main body 1 of the rubber crawler is shifted in the width direction of the driving or driven roller (right direction of FIG. 3) owing to some cause, for example, force generated when the crawler collides with an obstacle on a road surface, as shown in FIG. 3, the main body 1 of the rubber crawler, for example, relatively shifts to the right side with respect to the rollers 3 whereby the S-twist cord portion on the left side with respect to the running direction of the main body 1 of the crawler moves to not only the left roller 3L of the rollers 3 but also the right roller 3R.

In this case, the meandering force B resulted from torsion force by twist return of the S-twist cords 2S on the left side of the running direction is increased as compared with the meandering force A resulted from torsion force by twist return of the Z-twist cords 2Z on the right side of the running direction, and as a result the main body 1 of the rubber crawler is apt to move to the left direction. Hence, the sift to the right direction in FIG. 3 is automatically compensated to be revised to a correct state, whereby the main body 1 of the crawler is prevented from being disconnected from the rollers 3.

Figure 5:
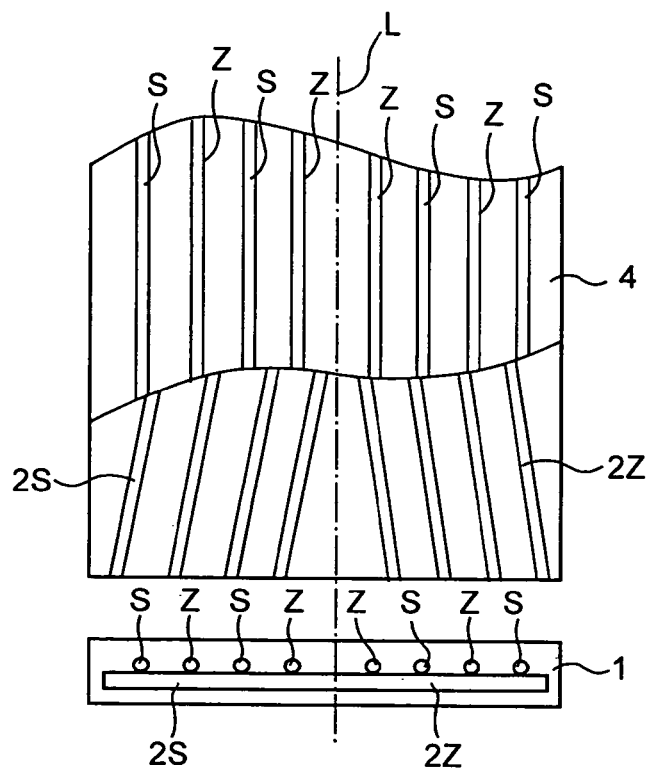
FIG. 5 is a plan view and cross section view showing a second embodiment of the coreless rubber crawler according to the invention.

FIG. 5 is a plan view and cross section view showing a second embodiment of the coreless rubber crawler of the invention. In the S-twist cords 2S on the left side in the running direction and the Z-twist cords 2Z on the right side in the running direction, the extension direction of each of the twist cords 2S, 2Z is inclined in the outside direction with respect to the centerline L when is viewed from the (forward) running direction.

Further, it is preferred that a cord layer having cord arrangement capable of compensating meandering property in a width direction of the main body is superposed on the S-twist and Z-twist cords 2S, 2Z to form a laminate, and the laminate is embedded in the main body. The cord layer 4 for the compensation has a structure that a Z-twist cord, S-twist cord, Z-twist cord and S-twist cord are arranged in this order alternatively in the direction of from the centerline L to the both sides (in the width direction). By adopting the above structure, i.e., a laminated structure including the cord layer 4 for the compensation, high tractive stiffness of the structure is ensured and as a result durability of the main body 1 of the crawler is improved. Further, in addition to twist properties of each of the cords, meandering force generated by application of cord angle of the twist cords can be effectively brought out, whereby the sift of the main body 1 is automatically and effectively compensated.

Figure 6:
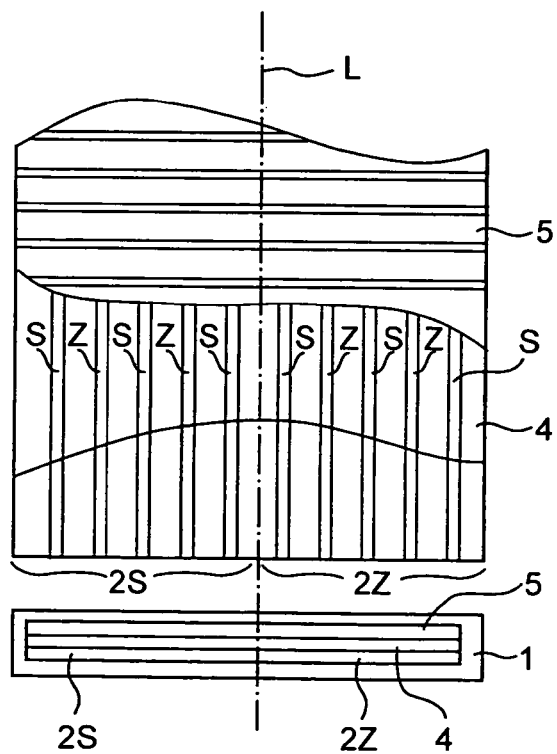
FIG. 6 is a plan view and cross section view showing a third embodiment of the coreless rubber crawler according to the invention.
Figure 7:
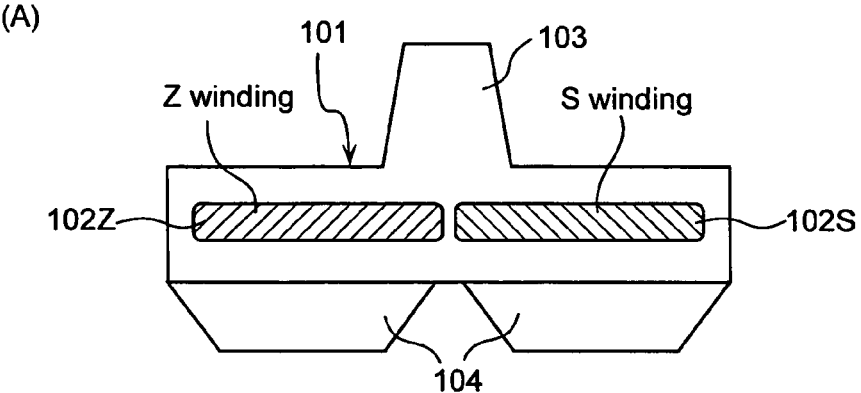
FIG. 7 is a view showing a conventional coreless rubber crawler.
Figure 7:
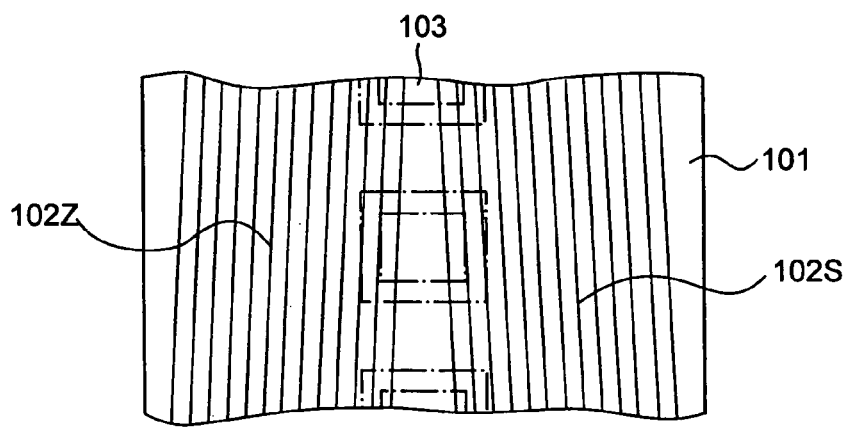
Figure 7:
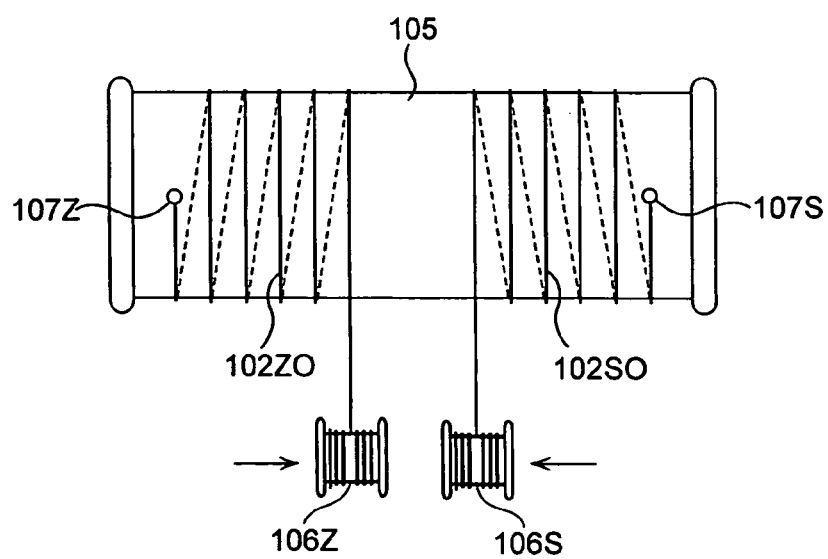
Figure 8:
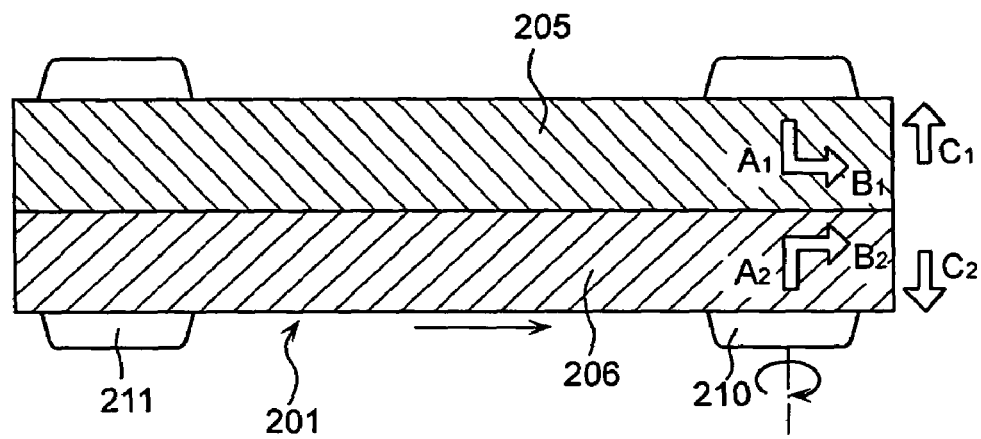
FIG. 8 is a view showing a conventional coreless rubber crawler.
Figure 9:
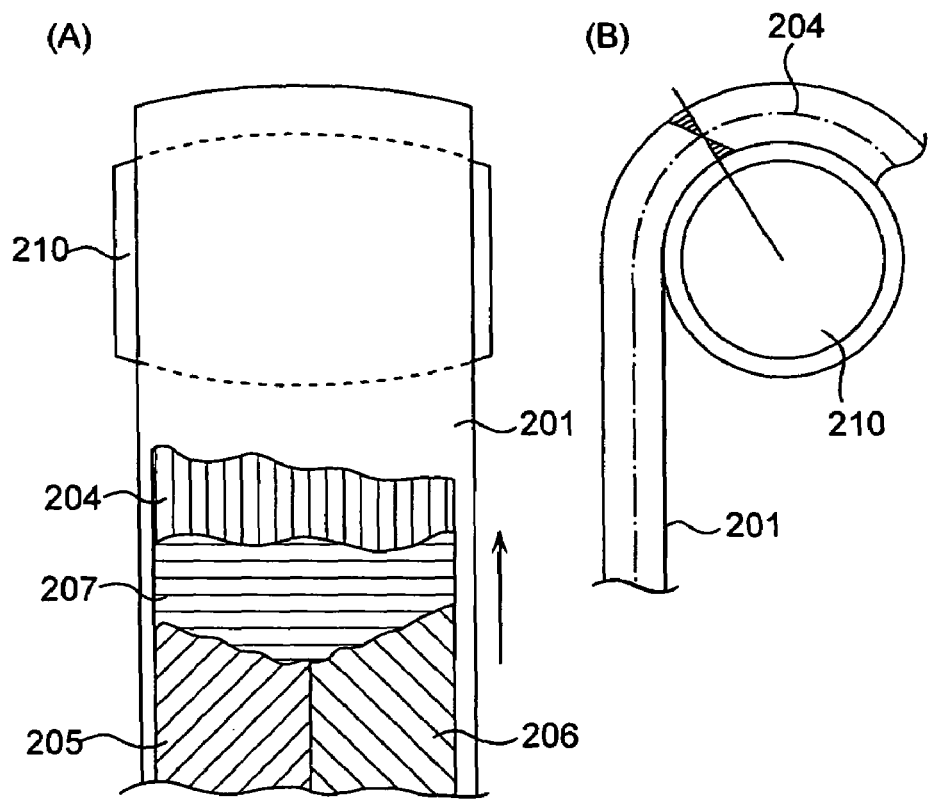
FIG. 9 is an enlarged view showing the feature of a conventional coreless rubber crawler.

FIG. 6 is a plan view and cross section view showing a third embodiment of the coreless rubber crawler of the invention. A perpendicularly crossing cord layer 5 is superposed on the S-twist cords 2S and Z-twist cords 2Z, and the perpendicularly crossing cord layer 5 has an angle in the extension direction of the cords crossing at right angles with respect to a lengthwise direction of the main body 1.

In the embodiment of FIG. 6, the cord layer 4 for the compensation used in the second embodiment of FIG. 5 is provided between the crossing cord layer 5 and a layer of the S-twist and Z-twist cords. By adopting this structure, the meandering force generated in the width direction can be compensated, or by provision of these two reinforcing layers that do not generate the meandering force in the width direction, high tractive stiffness is further enhanced. Thus, the durability of the main body 1 of the rubber crawler is enhanced and simultaneously the automatic compensation of the shift of the main body 1 can be effectively performed by providing the S-twist cords 2S and the Z-twist cords 2Z.

The embodiments of the invention has been explained in detail in the above description. However, appropriate changes can be made with respect to the shape and type of the main body of rubber crawler, the type of the main and bias cords (e.g., rubberized cords, cords directly embedded in the main body, or use of appropriate materials, e.g., steel or organic fiber, for the cords), the shape and type of the cord layer for the compensation, the shape and type of the perpendicularly crossing cord layer, the angles of the cords, the form of the twist cord, and the shape and type of the driving and driven rollers, so long as the changes may be made without departing from the scope of the invention.

As mentioned above, the constitution of the invention lies in the coreless rubber crawler in the form of endless belt comprising a number of cords embedded in a main body of the rubber crawler at predetermined intervals in a width direction of the rubber crawler with extended in a lengthwise direction of the rubber crawler, and being rotatably connected around a driving roller and a driven roller, wherein the crawler is divided into two areas by a centerline in the width direction of the main body, one of the two areas comprising S-twist cords and the other area comprising Z-twist cords. By the constitution, in case the main body of the rubber crawler is shifted in the width direction of the driving or driven roller, the difference between the torsion force by twist return caused by application of the tractive driving force of the roller to the S-twist cords and the torsion force by twist return caused by the Z-twist cords, the S- and Z-twist cords being divided by the centerline, brings about the automatic compensation of the shift (deviation) to enhance the running stability, whereby the main body of the crawler is prevented from being disconnected from the rollers.

Particularly, in case cords located on a left side of a running direction in the width direction of the main body 1 comprises S-twist cords, while cords located on a right side of the running direction comprises Z-twist cords, the automatic compensation of the shift (deviation) is made in the forward running condition that corresponds to almost of the running condition to enhance the running stability, whereby the main body of the crawler is prevented from being disconnected from the rollers.

Further, in case the driving roller and the driven roller comprises a pair of rollers having the same width as each other, the rollers being a left roller and a right roller located at intervals with respect to an axis of the rollers, the whole surfaces of the left driving roller and the right driven roller each are in contact with the S-twist cords or Z-twist cords in a relative wide area to control swing caused by the frequent compensation.

Further, in case the S-twist cords and the Z-twist cords are provided such as they are each inclined in the outside direction with respect to the centerline when viewed from the running direction, the restoring force caused by the angle of the cords is added to the return force of twist generated by driving of the driving roller to bring about the effective compensation.

Furthermore, in case the S-twist and Z-twist cords and a cord layer superposed thereon are provided in the main body, the cord layer having cord arrangement capable of compensating meandering property in a width direction of the main body, the addition of the cord layer for compensation ensures high tractive stiffness and as a result durability of the main body of the crawler is improved.

Moreover, in case the perpendicularly crossing cord layer is superposed on the S-twist and Z-twist cords in the main body, the perpendicularly crossing cord layer having a cord angle crossing at right angles with respect to a peripheral direction of the main body, the additional provision of the reinforcing layer (the cord layer) that do not generate the meandering force in the width direction enhances tractive stiffness with enhancing the durability of the main body of the rubber crawler and further the automatic compensation of the shift of the main body is also maintained by providing the S-twist cords 2S and the Z-twist cords 2Z.

Thus, the present invention provides a coreless rubber crawler which ensures running stability by compensating shift (deviation) in the width direction even if prepared by combination of usual rollers, and which can be easily and in low cost prepared by adoption of simple structure.

The list of reference numbers in Figs. is as follows:
1: Main body of rubber crawler
2: Cord
2S: S-twist cord
2Z: Z-twist cord
3: Driving roller (or driven roller)
4: Cord layer for compensation
5: Perpendicularly crossing cord layer
L: Centerline

What is claimed is:

1. A coreless rubber crawler in the form of endless belt comprising a number of cords embedded in a main body of the rubber crawler at predetermined intervals in a width direction of the rubber crawler and extending in a lengthwise direction of the rubber crawler, and being rotatably connected around a driving roller and a driven roller, wherein the main body is divided into two areas by a centerline in the width direction of the main body, one of the two areas comprising S-twist cords and the other area comprising Z-twist cords, and wherein the S-twist cords and the Z-twist cords are each inclined in an outside direction with respect to the centerline and with respect to a running direction when viewed in cross section with respect to the width of the main body, wherein the S-twist cords and the Z-twist cords and a cord layer superposed thereon are provided in the main body, the cord layer having a cord arrangement, in each of the two areas, or alternating S-twist cords and Z-twist cords.

2. A coreless rubber crawler in the form of endless belt comprising a number of cords embedded in a main body of the rubber crawler at predetermined intervals in a width direction of the rubber crawler and extending in a lengthwise direction of the rubber crawler, and being rotatably connected around a driving roller and a driven roller, wherein the main body is divided into two areas by a centerline in the width direction of the main body, one of the two areas located on a left side with respect to a running direction comprising S-twist cords and the other area located on a right side with respect to the running direction comprising Z-twist cords, and wherein the S-twist cords and the Z-twist cords are each inclined in an outside direction with respect to the centerline and with respect to the running direction when viewed in cross section with respect to the width of the main body, wherein the S-twist cords and the Z-twist cords and a cord layer superposed thereon are provided in the main body, the cord layer having a cord arrangement, in each of the two areas, or alternating S-twist cords and Z-twist cords.

3. The coreless rubber crawler as defined in claim 1 or 2, wherein the driving roller and the driven roller comprise a pair of rollers having the same width as each other, the rollers being a left roller and a right roller located at intervals with respect to an axis of the rollers.

4. The coreless rubber crawler as defined in any of claims 1 or 2, wherein the cord layer is configured to compensate for a meandering property in a width direction of the main body.

5. The coreless rubber crawler as defined in any of claims 1 or 2, comprising:

a perpendicularly crossing cord layer superposed on the S-twist and Z-twist cords, the perpendicularly crossing cord layer having a cord angle crossing at right angles with respect to a peripheral direction of the main body.

* * * * *